(12) United States Patent
Yildirim

(10) Patent No.: US 8,485,859 B2
(45) Date of Patent: Jul. 16, 2013

(54) PLASTIC BEEHIVE

(76) Inventor: Muzaffer Yildirim, Istanbul (TR)

( * ) Notice: Subject to any disclaimer, the term of this patent is extended or adjusted under 35 U.S.C. 154(b) by 552 days.

(21) Appl. No.: 12/666,633

(22) PCT Filed: Jun. 27, 2008

(86) PCT No.: PCT/IB2008/052593
§ 371 (c)(1),
(2), (4) Date: Dec. 23, 2009

(87) PCT Pub. No.: WO2009/004550
PCT Pub. Date: Jan. 8, 2009

(65) Prior Publication Data
US 2010/0203802 A1 Aug. 12, 2010

(30) Foreign Application Priority Data
Jun. 29, 2007 (TR) ................ a 2007 04518

(51) Int. Cl.
*A01K 47/00* (2006.01)
*A01K 47/06* (2006.01)
(52) U.S. Cl.
USPC ................... 449/14; 449/3; 449/30

(58) Field of Classification Search
USPC ..... 449/3, 13, 14, 15, 29, 30, 32, 34; 403/273
See application file for complete search history.

(56) References Cited

U.S. PATENT DOCUMENTS

| | | | | |
|---|---|---|---|---|
| 1,116,919 A | * | 11/1914 | Rahn | 449/14 |
| 1,435,118 A | * | 11/1922 | Heim et al. | 449/10 |
| 1,441,524 A | * | 1/1923 | Platten | 449/13 |
| 2,292,110 A | * | 8/1942 | Evans | 449/14 |
| 2,709,820 A | * | 6/1955 | Wahl | 449/14 |
| 3,110,044 A | | 11/1963 | William | |
| 3,968,531 A | * | 7/1976 | Cartwright | 449/30 |
| 4,135,265 A | | 1/1979 | Van de Kerkof | |
| 4,337,541 A | | 7/1982 | Brown | |
| 5,628,671 A | * | 5/1997 | Stevens | 449/6 |
| 2008/0119110 A1 | | 5/2008 | Katsampis | |

FOREIGN PATENT DOCUMENTS

| | | |
|---|---|---|
| FR | 1443479 A | 9/1966 |
| FR | 2540339 A | 8/1986 |
| WO | 2006/085124 A | 8/2006 |

* cited by examiner

*Primary Examiner* — Rob Swiatek
(74) *Attorney, Agent, or Firm* — Venable, Campillo, Logan & Meaney PC

(57) ABSTRACT

Demounted beehives wherein the air circulation is realized effectively and the heat isolation is enhanced. The beehive essentially comprises one or more body (5), a top cover (2) and also a lower cover (7).

8 Claims, 7 Drawing Sheets

(a)  (b)

PLASTIC BEEHIVE

FIELD OF THE INVENTION

The present invention relates to demounted beehives wherein the air circulation is realized effectively and the heat isolation is enhanced.

BACKGROUND OF THE INVENTION

The beehives known in the state of the art are produced from wood, metal or plastic. The beehives take up a lot of space by volume and this causes carrying problems. In addition the ventilation and the heat isolation of the beehives are not on desired level and this leads to not being able to obtain the appropriate conditions for the bees.

In French patent document No. FR2540339 which is within the state of the art, a beehive wherein the walls are fastened to each other by shrink-fit without requiring rawlplug is mentioned.

In Greek patent document No. GR1005104 which is within the state of the art, a hive wherein the walls are fastened to each other by shrink-fit is mentioned. The walls which have been engaged to each other by shrink-fit in this hive provide the isolation so as not to allow fluid transition.

In Turkish utility model document No. TR 2003 02332 Y which is within the state of the art, a heat isolated plastic beehive which is produced with blow moulding technology from polyethylene, polystyrene and polypropylene and has walls whose inner surfaces are empty is mentioned.

SUMMARY OF THE INVENTION

The objective of the present invention is to realize a beehive wherein the air circulation is realized effectively and the heat isolation is enhanced.

Another objective of the present invention is to realize a beehive which is demountable and thus can be carried easier by taking up less space while in demounted condition.

The beehive realized to fulfill the objective of the present invention is described in claims. The beehive essentially comprises one or more bodies, a top cover and also a lower cover. The body is produced with blow moulding technology and its inside is empty. By filling these cavities with polyurethane, the isolation is provided. The body may be composed of one or more floors. Each floor is composed by fastening four walls to one another. These walls are locked to each other with cavity-core nail system. Thus additional requirements like rawlplug, screw, etc. are not needed. On the edge of two of the walls there are nails which will provide the shrink-fit and on the edges of the other two walls there are housings in which the nails will settle. The nails settle in these housings by fitting in stretchingly and thus realize the locking.

The layers are locked to each other with locking system, by means of fitting on one another. These locking latches both provide engagement of layers to each other and to carry the hive easily with the handle that it has.

On the bottom of the hive, there is a lower cover on which the layers are settled. On the lower cover, there are bee entrance tunnels wherein the bees enter. Also below the lower cover, there are ventilation channels which are consisted of several pieces and can be cleaned by dismantling.

On top of the hive, there is a top cover. The louvers which are located on the top cover enable air inlet. The ventilation channels that are present on the lower cover and the louvers that are present on the top cover enable the realization of air circulation in the hive effectively.

DETAILED DESCRIPTION OF THE INVENTION

The beehive realized to fulfill the objective of the present invention is illustrated in the accompanying figures, in which.

Figure 11:
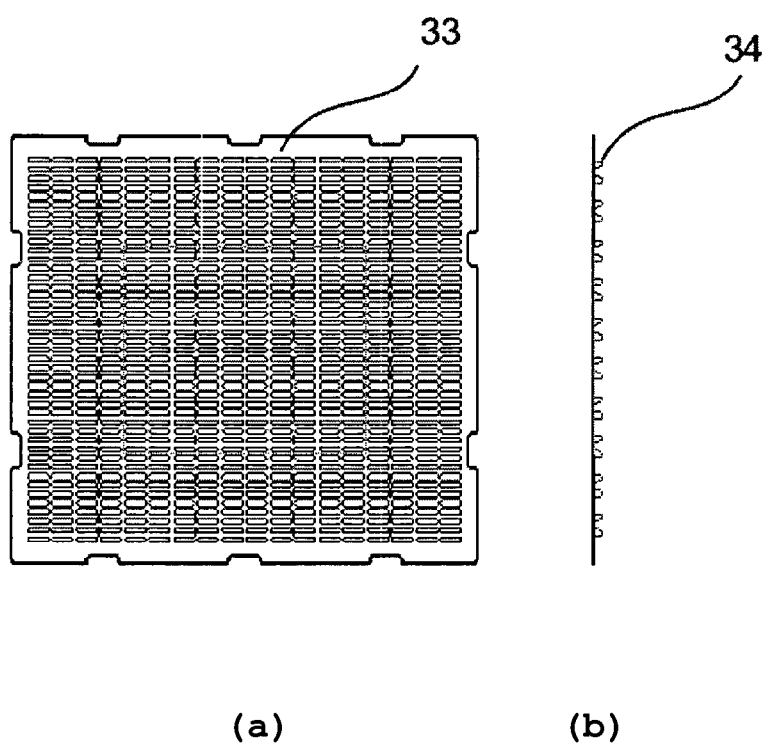

FIGS. 11(a) and (b) are top and side views of the queen bee section filter, respectively.

Figure 1:
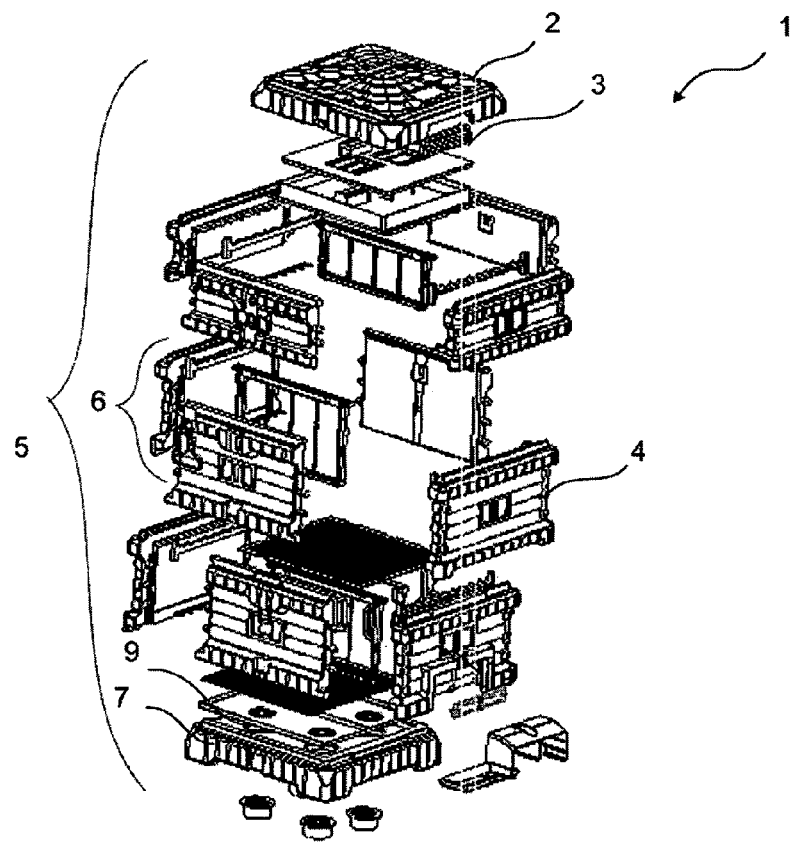
FIG. 1 is the exploded view of the inventive hive.
Figure 2:
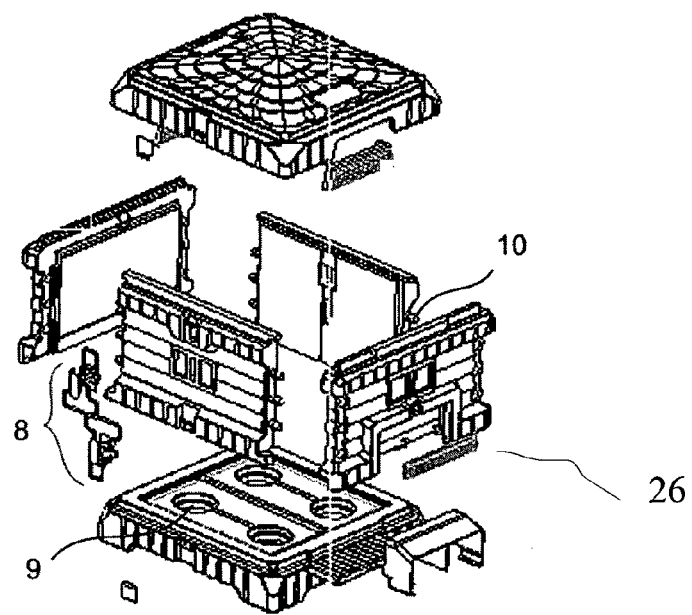
FIG. 2 is the exploded view of a single-layered embodiment of the inventive hive.
Figure 3:
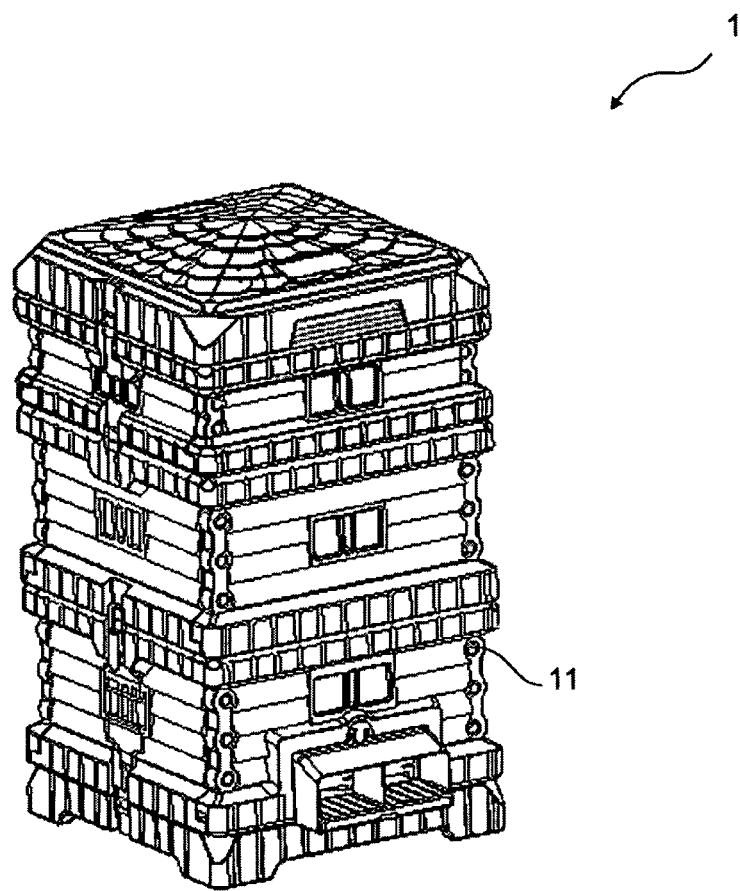
FIG. 3 is the perspective view of the hive.
Figure 4:
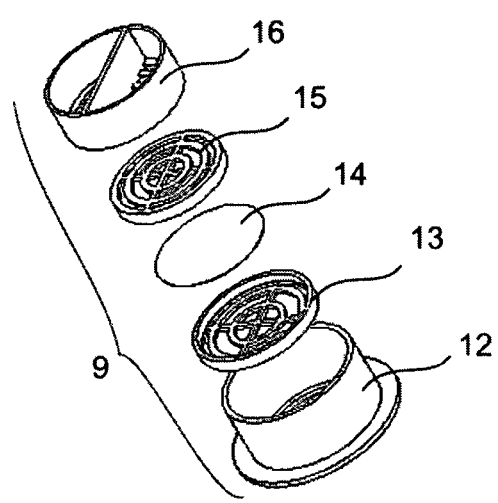
FIG. 4 is the exploded view of the ventilation channels.
Figure 5:
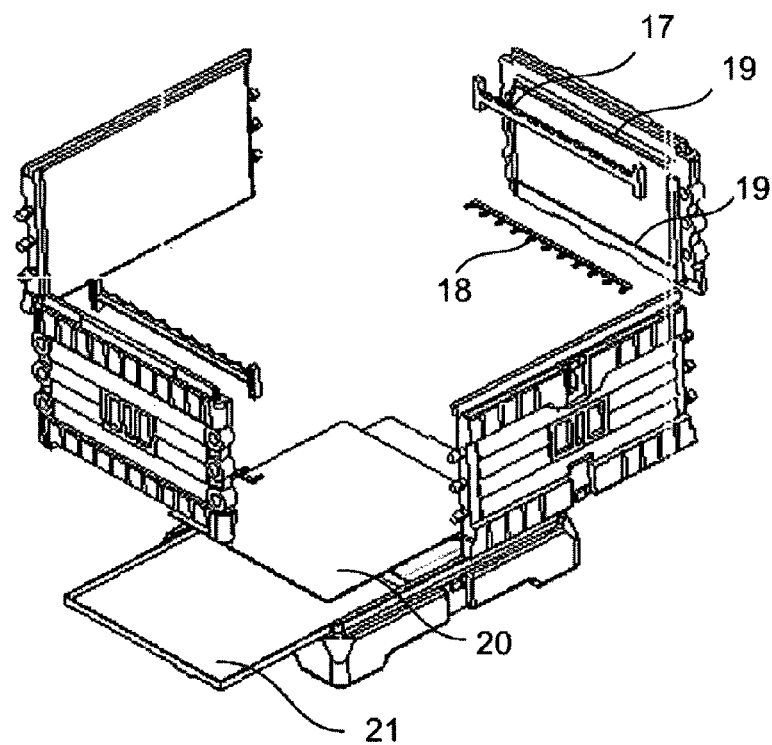
FIG. 5 is the exploded view of the inner parts of the hive.
Figure 6:
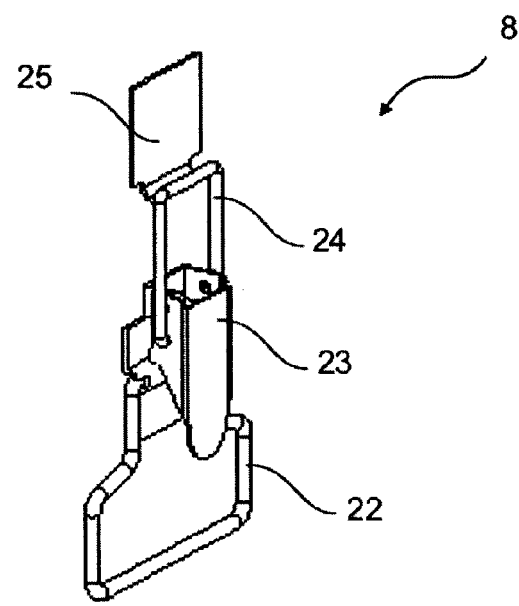
FIG. 6 is the perspective view of the locking latch.
Figure 7:
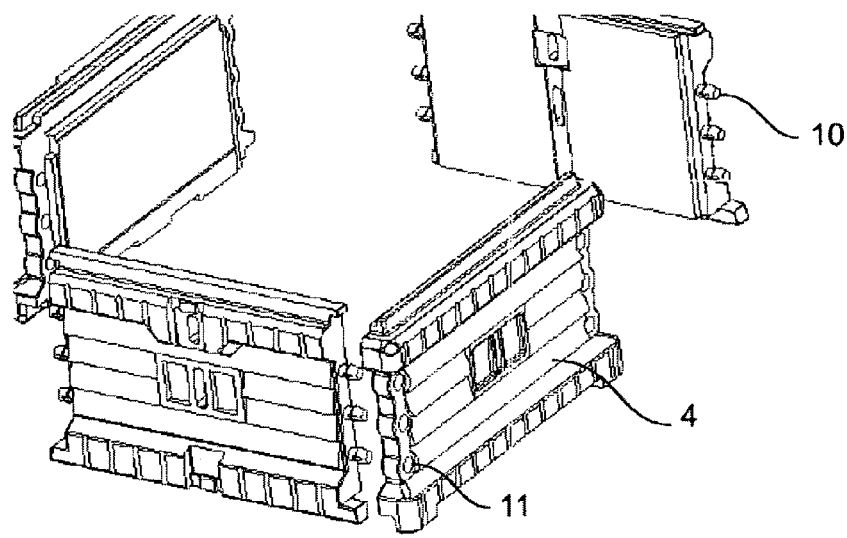
FIG. 7 is the perspective view of the walls.
Figure 8:
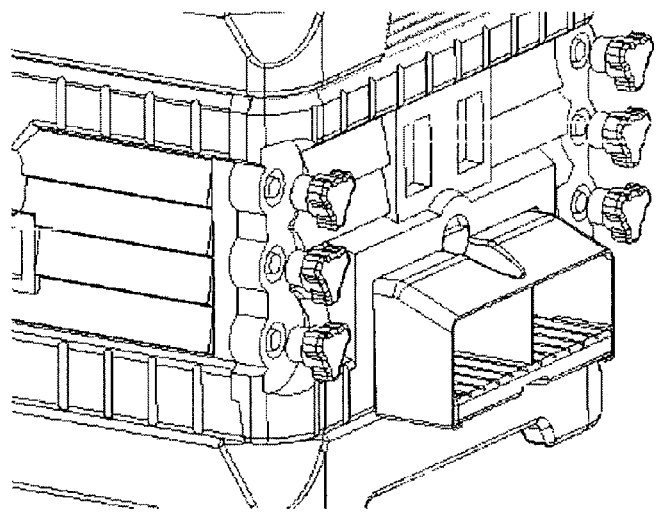
FIG. 8 is the perspective view of an embodiment of the hive wherein the walls are fastened to each other with screws.
Figure 9:
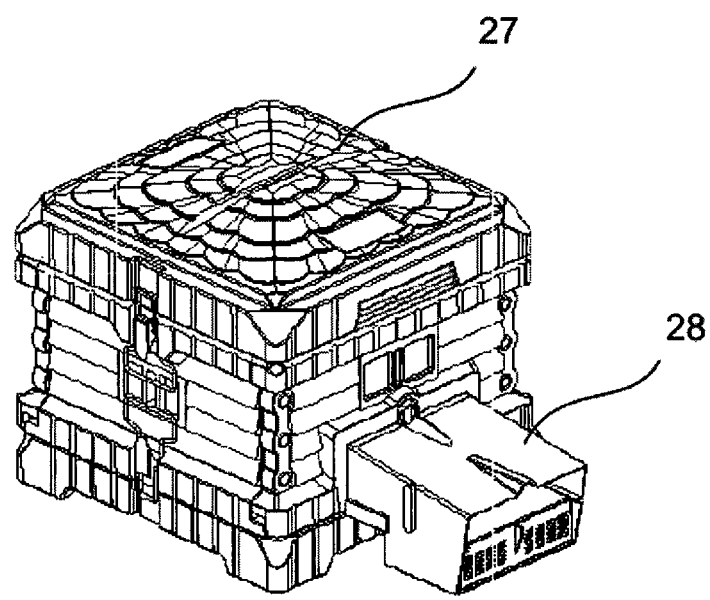
FIG. 9 is the perspective view of the hive entrance while the pollen trap is being attached.
Figure 10:
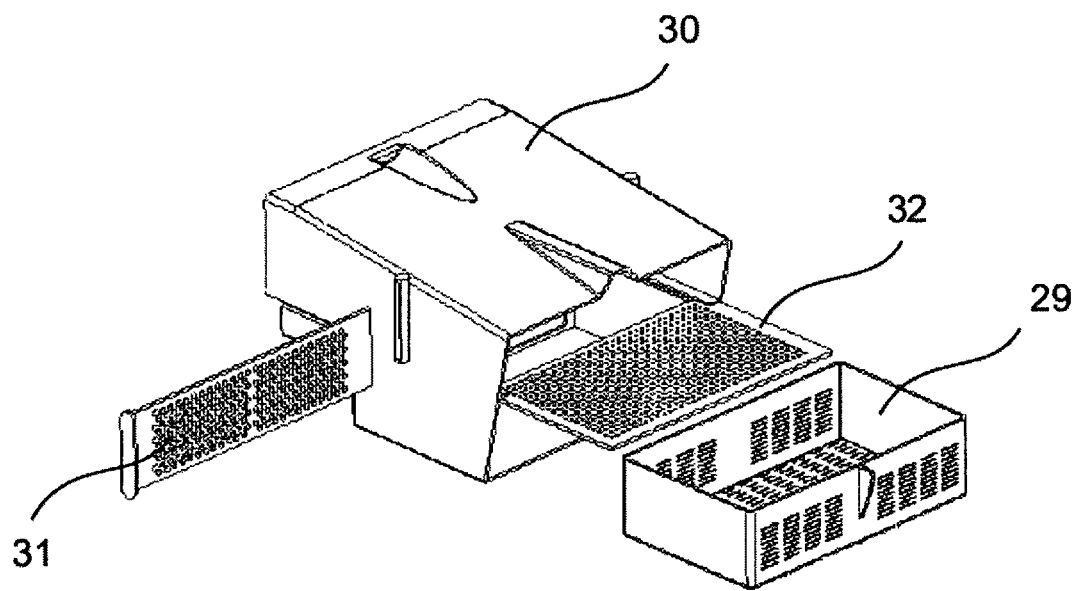
FIG. 10 is the exploded view of the pollen trap.

The parts shown in the figures are individually numbered, where the numbers refer to the following:

1. Hive
2. Top cover
3. Louver
4. Wall
5. Body
6. Layer
7. Lower cover
8. Locking latch
9. Ventilation channel
10. Nail
11. Housing
12. Ventilation grille
13. Lower filter grating
14. Filter
15. Filter top grating
16. Ventilation screw
17. Upper bearing apparatus
18. Lower bearing apparatus
19. Groove
20. Varoe filter
21. Drawer
22. Holder
23. Tongue
24. Handle
25. Hanger
26. Sun shield
27. Channel
28. Pollen trap
29. Pollen trap drawer
30. Pollen trap body
31. Pollen filter
32. Pollen strainer
33. Queen bee filter
34. Rib The inventive hive (1) comprises a lower cover (7) which closes the bottom part of the hive (1), a top cover (2) which closes top of the hive (1), a body (5) which is composed of at least one layer (6), walls (4) which compose the layers (6) and connected to each other by shrink-fit as shown in for example, FIG. 7, locking latches (8) which provide the connection of the layers (6) to each other and also the carriage of the hive, louver (3) which is present on the top cover (2) and provides the ventilation and ventilation channels (9) which are present on the lower cover (7) and provide the air circulation.

The body (5) is composed of one or more layers (6). Whereas the layers (6) are composed of walls (4) which are connected to each other by shrink-fit. The walls (4) are produced with blow moulding technology and their inside is empty. By filling these cavities with polyurethane, the isolation is provided. There is a top cover (2) which closes top of the body (5). Also the bottom of the body (5) is closed by means of fastening the bottom layer on a lower cover (7).

There are nails (10) on the edges of two of the walls (4) which compose a layer (6) whereas there are housings (11) wherein these nails (10) are fastened by shrink-fit on the edges of the other two walls. The nails can settle in housing (11) by fitting in stretchingly. Also in another embodiment, a screwed structure can be used instead of these nails (10). The fastening of the screws by settling to the housing (11) instead of the nail (10) can be provided.

The top cover (2) closes the top of the hive (1). The top cover (2) settles on the top layer as cavity-core, by layer. There is a louver (3) on the top cover (2) in order to provide air circulation. A climatic environment is formed by the supply of air circulation and also moisture formation is prevented. While the air transition is provided owing to the gauze filter which closes the louver (3), it is not possible to for the bees to go out or the entrance of a foreign substance from the outside to the inside. Also owing to the structure of the louver (3), rain-waters and wind are prevented to get into directly.

The layers (6) composing the hive (1) settle on the lower cover (7) and close the bottom of the hive (1). There are four ventilation channels (9) on the cover (7). These ventilation channels (9) provide the air circulation of the hive (1) together with the louvers (3) which are present on the top cover (2). The ventilation channels (9) are made screwed so as to be easily dismantled to be able to make the periodic cleanings. There are a ventilation grille (12), a filter bottom grating (13) placed into this grille, a filter (14) present on this, a filter top grating (15) holding the filter and a ventilation screw (16) on all of them. The edges of the ventilation screw (16) and the interior of the ventilation grille (12) are in screwed structure and the ventilation screw (16) is fitted and displaced by turning into the ventilation grille (12). By this means, easily disconnection from each other and easily displacement of the parts has been provided and this situation has provided advantage for the periodic cleaning.

In order to fasten the layers (6) to each other, there are two locking latches (8) on the two sides of the hive (1). The hanger (25) which is the part of the locking latch (8) that will make the locking, is on the upper part whereas the handle (24) which will carry out the locking by means of attaching on the hanger, is on the lower part. The hanger (25) of the locking latch (8) is attached to the upper layer which is one of the layers that will be fastened to the each other whereas the handle (24), the tongue (23) and the holder (22) are attached to the lower layer. The handle (24) can move downward and upward by means of moving the tongue (23) in the manner that it makes spring movement. In addition, the handle (24) moves circularly on condition that the holes to which it is being connected to the tongue (23) are center. The handle (24) is pulled downward and the locking is carried out by means of attaching of the handle (24) to the hanger (25) and closing the tongue (23) in consequence of these movements. The holder (22) is used in carrying the hive (1), independently of the locking.

There are upper bearing apparatus (17) and lower bearing apparatus (18) in the mutual inner sides of the two of the walls (4) to attach the honey frames inside the layers (6). These bearing apparatuses (17 and 18) are attached to the grooves (19). The upper bearing apparatus (17) is shaped in such a manner that one side is serrated and the other side is flat. When the serrated part is attached to the groove (19) in such a manner that it will be on the upper side, the frames settle on this serrated part and the moving of the frames is prevented. The lower bearing apparatus (18) is in a combed structure as well and these combs prevent the moving of the frame which is settled between the teeth.

There is varoe filter (20) just on the lower cover (7). Owing to this filter (20) the bees are protected from harmful elements. The harmful elements which pass under this filter (20) are accumulated in a drawer (21) and the cleaning of this drawer by means of removing can be possible.

There is sun shield (26) which covers the entrances wherein the bees enter the hive, on the hive (1). These sun shields (26) protect the entrances against sun. Pollen trap (28) can be attached to the place wherein the bees enter, instead of the sun shield (26). This pollen trap (28) serves to collect the pollens on the bees during their entrance into the hive and to accumulate them in a drawer (29). While the bees are entering the hive, during they are passing through the thin holed pollen filter (31) via the spilling of pollens which have been accumulated on them, these pollens are provided not to enter into the hive. The pollen trap (28) comprises a pollen drawer (29), a body (30), a pollen filter (31) and also a pollen strainer (32).

Upon the top cover (2) there is a channel (27) extending from end to end. More than one hive (1) which is superposed with this channel (27) can be fastened by a rope and the rope can stand without sliding by the positioning of the rope to this channel (27).

In order to prevent the queen bee which is present in the bottom layer of the hive (1) to climb up layers, there is queen bee filter (33) between the layers. The holes on this filter enable the worker bees to pass but they don't allow the queen bee to pass. The sizes of the holes are made in such a manner that only the worker bees can pass. Besides, there are ribs (34) in such a manner that they protrude below the filter (33). These ribs (34) prevent the filter (33) to become deformed by abutting the frames. At the same time, the ribs which are similarly present on seperators that are between the layers, prevent the seperators to become deformed.

The invention claimed is:

1. A beehive (1) having a top and a bottom part comprising
   a lower cover (7) having ventilation channels (9) and which closes the bottom part of the beehive (1),
   a top cover (2) having a louver (3) and which closes the top of the beehive (1),
   a body (5) which is composed of at least one layer (6) having walls (4) wherein the walls are connected to each other by shrink-fit, and
   locking latches (8) for connecting the at least one layer (6), the top cover and the lower cover
   wherein the louver (3) which is present on the top cover (2) and the ventilation channels (9) which are present on the lower cover (7) provide ventilation for air circulation.

2. The beehive (1) according to claim 1 wherein the walls (4) are hollow and have edges, and wherein there are nails (10) on the edges of two of the walls and there are housings (11) on the edges of the two other walls wherein the nails (10) fasten to the housings (11) by shrink-fit.

3. The beehive (1) according to claim 1 wherein the walls (4) are fastened to each other by screws.

4. The beehive (1) according to claim 1, 2 or 3 wherein the top cover (2) closing the top of the hive (1) and comprising the louver (3) to provide air circulation, further comprises a gauze filter which closes the louver (3) and prevents bees from going out through the louver and foreign substances from going inside while providing the air circulation.

5. The beehive (1) according to claim 1 wherein the lower cover (7) comprises four ventilation channels (9).

6. The beehive (1) according to claim 1 wherein the lower cover (7) comprising ventilation channels (9) further comprises a ventilation grille (12) whose inside is in form of screw, a filter bottom grating (13), which is placed into this grille, a filter (14) placed in to the filter bottom grating, a filter top grating (15) holding the filter and a ventilation screw (16) on the filter top grating which can be fitted and displaced by turning into the ventilation grille (12).

7. The beehive (1) according to claim 1 wherein the locking latches (8) further each comprise a hanger (25), a handle (24), a tongue and a holder (22) wherein the hanger is connected to the handle and the tongue is connected to the handle and the holder.

8. A beehive (1) according to claim 1 wherein the walls have mutual inner sides further comprise and an upper bearing apparatus (17) and a lower bearing apparatus (18) which are present on the mutual inner sides of the two of the walls (4) composing the at least one layer (6) to attach the honey frames inside the layers (6) wherein the upper bearing apparatus (17) and the lower bearing apparatus (18) are serrated for attaching honey frames.

\* \* \* \* \*